Dec. 2, 1941.   F. G. LUDWIG   2,264,991
INDICATING DEVICE FOR ROLL FILM
Filed March 4, 1941    3 Sheets-Sheet 3

INVENTOR.
Frederic G. Ludwig
BY Moses & Nolte
ATTORNEYS

Patented Dec. 2, 1941

2,264,991

UNITED STATES PATENT OFFICE 2,264,991

INDICATING DEVICE FOR ROLL FILM

Frederic G. Ludwig, Woodbridge, Conn.

Application March 4, 1941, Serial No. 381,675

8 Claims. (Cl. 116—124)

This invention relates to an indicating device for indicating the position of a desired portion of a photographic film or other elongated web of thin material adapted to be wound onto a take-up reel. The invention is especially adapted for use in connection with a reading device for microfilms in which the film is wound from a full reel onto an empty take-up reel, a beam of light being passed through the film as it passes from one reel to the other and serving to project a greatly enlarged image of the film onto a viewing screen conveniently located in the operator's field of vision. Such reels of microfilm are in extensive use for recording the entire contents of newspapers, magazines and other voluminous printed matter so that the reels assume considerable size, for example, reels holding 100 feet of film are not uncommon. When viewing such long films in a viewing machine of this type, it is a tedious and time consuming operation to locate and view a particular portion or frame of the film in which the operator may be interested. Moreover, this operation also causes considerable eye strain for the reason that the image on the screen is out of focus while the film is in motion.

It is accordingly a main purpose of the present invention to provide an adjustable indicating device by means of which the operator may readily locate a particular portion or frame of the reel of film or other web material which he wishes to view. In pursuance of this object, the take-up reel is provided with two discs at one end thereof, one disc being rotatable with respect to the other and means being provided in connection with the discs to admit a ray of light therethrough at different distances from the center of the discs, the distance being adjustable by the operator to correspond to the position of the desired frame on the film. In the preferred embodiment of the invention, the position of the spot of light is determined by two narrow slots formed through the discs, the slot in one disc being substantially radial and that in the other disc being preferably in the form of a spiral, both of the slots extending substantially from the hub of the reel to almost the outer peripheries of the discs. At the point of intersections of the slots, a spot of light coming from a source behind the discs will pass through both discs and provision is made for determining the position of this spot by means of an index mark on one of the discs and a cooperating graduated scale on the other. When an amount of the film is wound on the take-up reel which is sufficient to just obscure the spot of light, this indicates that the desired frame on the film has been reached.

As the take-up reel is rotated to take up a film from the full reel, the spot of light mentioned traces an arcuate path. In a modified form of the invention, this arcuate path is made to appear more continuous to the operator by the provision of two oppositely disposed substantially radially arranged slots in one disc and a corresponding number of similar spirally arranged slots in the other disc.

It is a further object of the invention, in accordance with another modified form thereof, to form both the discs of opaque material and instead of making slots therein as heretofore described, to form a narrow translucent substantially radially extending area in one of the discs and a narrow translucent spirally arranged area in the other disc, the position of the spot formed by light passing through the point of intersection of the two translucent areas being adjustable according to the location of the desired frame on the roll of film. In this form of the invention also the desired frame on the film is located by reeling the film onto the take-up reel until the spot of light mentioned just becomes intercepted by the roll of film on the take-up reel.

Further objects of the invention will become apparent to those skilled in the art as the description thereof proceeds. For a better understanding of the invention, reference is made to the accompanying drawings in which.

Figure 1:
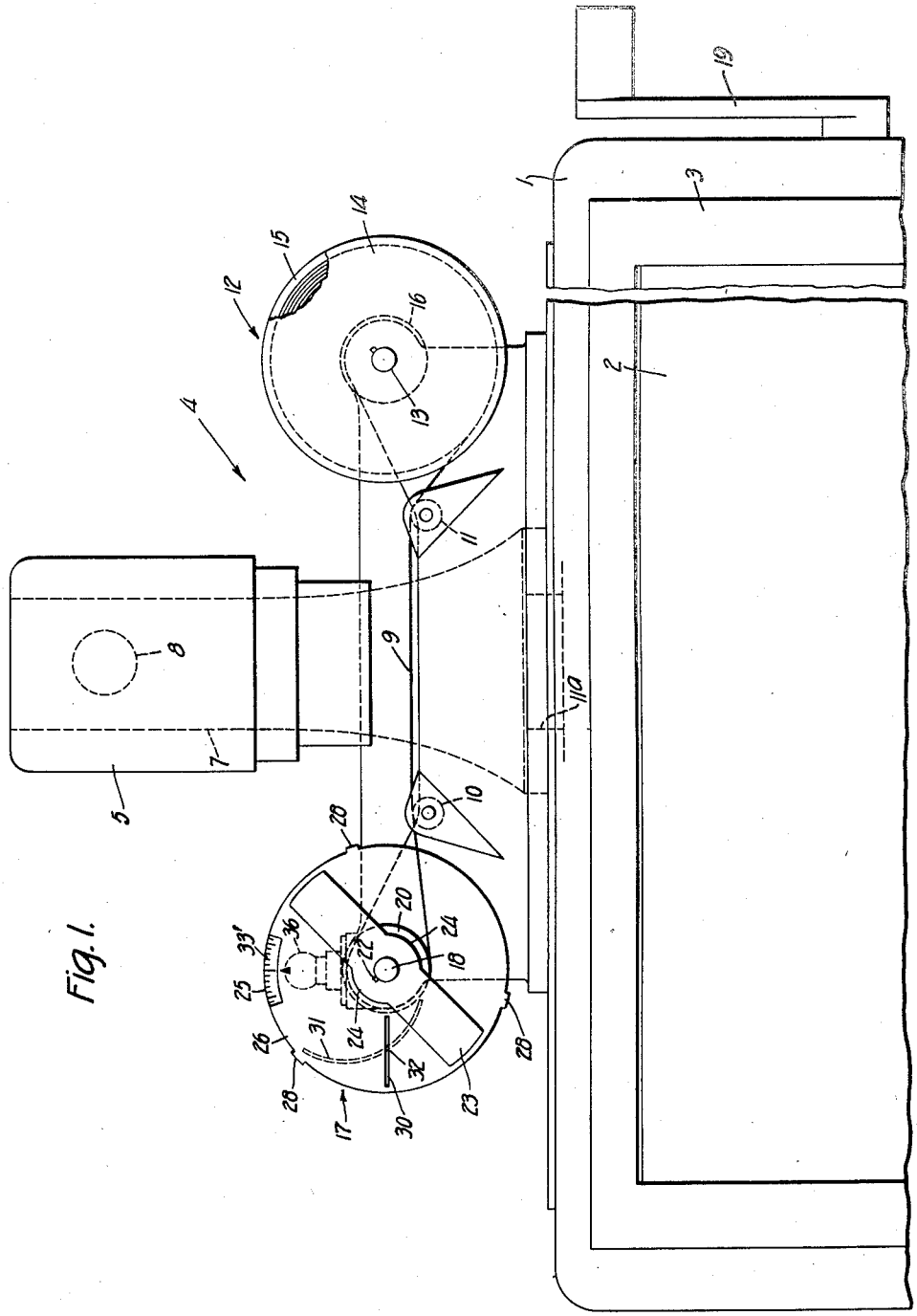
Fig. 1 is a fragmentary front view showing portions of a microfilm viewer or reader embodying the invention.
Figure 2:
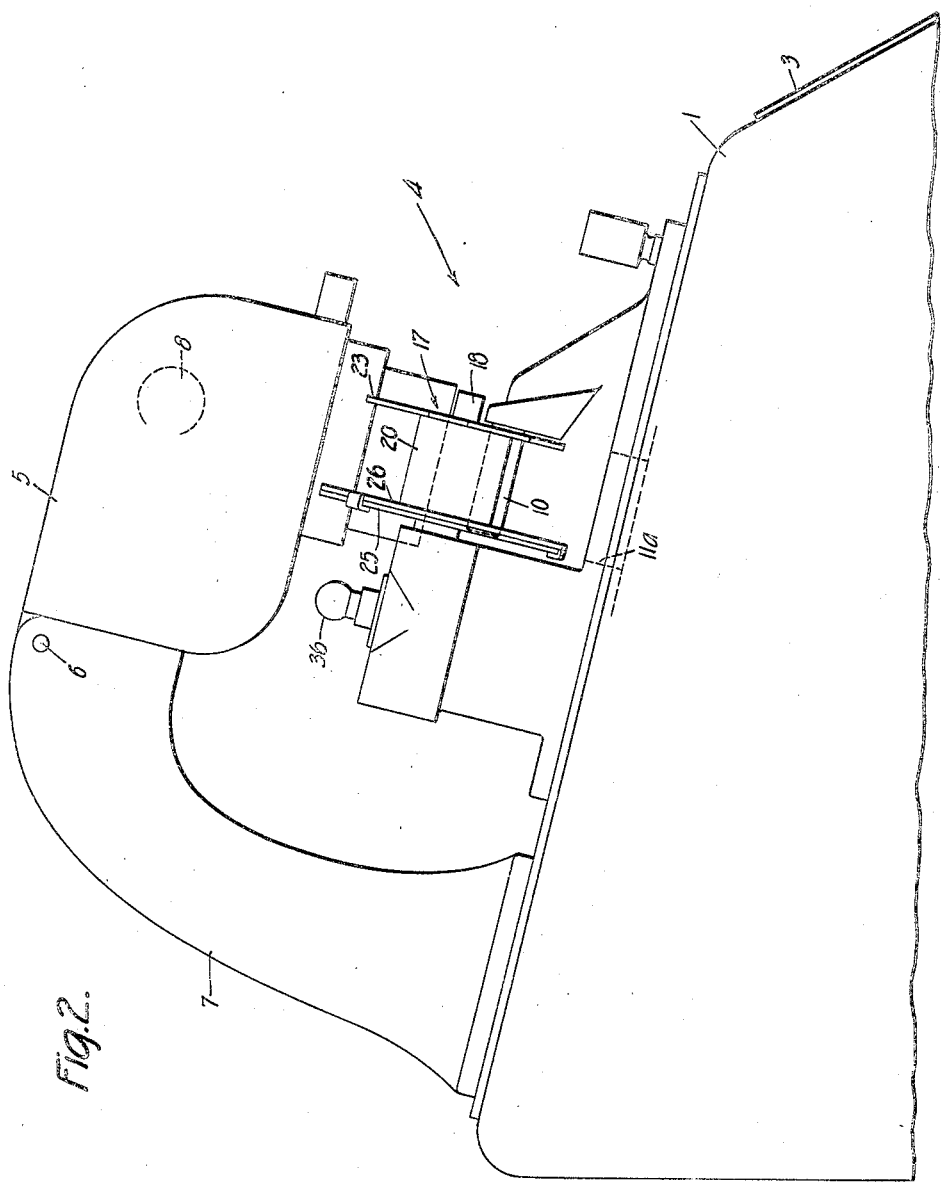
Fig. 2 is a fragmentary side view of the microfilm viewer shown in Fig. 1.
Figure 3:
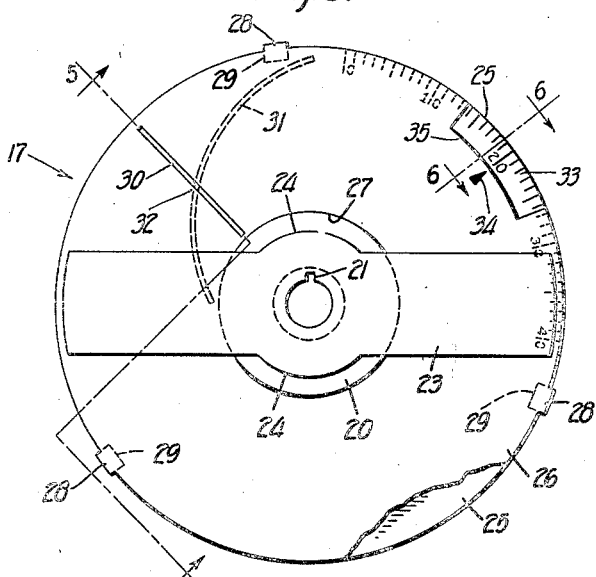
Fig. 3 is a front view on an enlarged scale showing the film take-up reel of Fig. 1 and illustrating a preferred embodiment of the invention.
Figure 4:
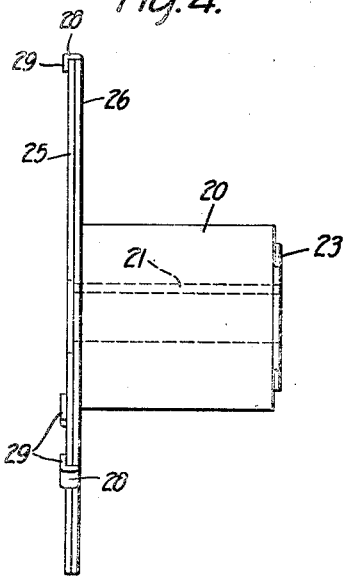
Fig. 4 is a side view of the take-up reel of Fig. 3 taken from the right thereof.
Figure 5:
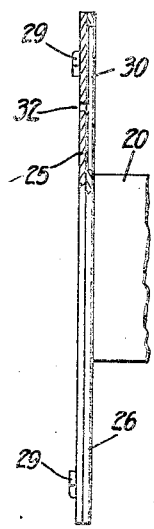
Fig. 5 is a fragmentary sectional view of the take-up reel shown in Fig. 3 taken on the line 5—5 thereof.

Referring to Figs. 1 and 2, the invention is shown in connection with a microfilm viewer comprising a casing 1 whose front is provided with a large viewing screen 2 formed of translucent plastic material and glass which is held in position on the casing 1 by a retaining frame 3. A projecting head 4 is supported on the top of casing 1 and comprises a hollow hood 5 pivoted at 6 on a supporting bracket 7, the hood 5 being provided with a suitable condensing lens (not shown) for directing the light from an electric lamp 8 onto a limited area of the straight portion of a microfilm 9 which is disposed between the guide rollers 10 and 11. The film image passes down through a slot 11a provided in the base of the projecting head 4 and top of the casing 1, and after being reflected and enlarged by a suitable reflector and lens system (not shown) appears in a much enlarged form on the viewing screen 2 where it may be conveniently read by the operator. The film passes from a pay-out reel 12 which is pivotally mounted at 13 at one end of the projecting head 4, the reel 12 being of known construction and comprising the front and rear flanges 14 and 15 and a hub portion 16 onto which the film has been wound. After passing over the guide rollers 11 and 10, the film passes onto a take-up reel 17 which is adapted to be readily attached to a drive shaft 18 journaled in the projecting head 4 and adapted to be rotated by means of a crank handle 19 which is located in a position convenient to the operator and to which the drive 18 is connected by means of suitable gearing, not shown.

The invention is shown as applied to the take-up reel 17 which is provided with a cylindrical hub 20 in which a keyway 21 is formed adapted to receive a key 22 provided on the drive shaft 18 to establish a readily detachable driving connection between the shaft 18 and take-up reel 17. Referring to Figs. 3 to 6, the take-up reel is shown as comprising a narrow bar 23 which is attached to the front end of the hub 20, the center portion of the bar being defined by upper and lower arcuate portions 24 which are of smaller radius than the hub 20, so that even the innermost turn of any film wound on the hub is exposed to view. At its rear end the hub 20 is provided with a thin circular disc 25 which is attached to the hub 20 and a thin contacting disc 26 which is provided with a center bore 27 adapted to fit loosely on the hub. For the purpose of readily retaining the discs 25—26 in a desired angular position with reference to each other, the disc 26 is provided with a plurality of spaced projecting fingers 28 which are bent over, as shown, to provide inwardly directed end portions 29 which frictionally engage the rear surface of the disc 25.

The front disc 26 is provided with a substantially radially extending narrow slot 30 and the rear disc 25 with a spiral shaped narrow slot 31, suitable indicating means being provided to determine the settings of the discs and the position of the point of intersection 32 of the slots 30 and 31. The indicating means shown comprises a graduated scale 33 which is formed on the front surface of the disc along its marginal edge, and an indicating mark 34 formed on the disc 26 adjacent to a cut-out 35 formed therein to permit the graduated scale 33 to be read. An electric light 36 is preferably mounted on the end of the projecting head 4 to provide a source of illumination for use in connection with the take-up reel 17, although it will be understood that light for this purpose may come from any other suitable light source disposed at the rear of the take-up reel.

In using the film viewer, the disc 26 is rotated on the hub 20 to bring the index mark 34 opposite a scale graduation 33 which corresponds to the position of the desired frame on the film 9. This graduation may be read off a table which has been previously prepared for the roll of film in question. For example, if the pages of a newspaper are photographed in numerical order on consecutive frames of the film, such a table may indicate that the page 20 of the paper is projected onto the screen 2 when graduation 10 of the scale is opposite index mark 34, that page 45 of a later issue of the same paper is projected when graduation 20 is opposite the index mark, page 70 of still a later issue is projected when graduation 30 is opposite the index mark, etc. After thus setting the disc 26 and attaching the end of the film to the hub 20 of the take-up reel, the operator rotates the crank handle 19 which causes the rotation of the take-up reel and the winding of the film thereon. The light passing through the point of intersection 32 of the slots 30 and 31 traces an arcuate path which is visible to the operator as the winding of the film progresses. As soon as enough film has been wound onto the hub 20 as to cover the point of intersection 32, the arcuate path of light ceases to be visible to the operator, thereby indicating that the desired frame on the film has been reached. The operator thereupon stops rotating the handle 19 which is permitted to remain at rest while the operator views the image of the desired page on the screen 2. If the exact frame desired is not in view, the handle 19 may be rotated forwards or backwards a slight amount until the desired result is secured. From the above it will be observed that the indicating device provides a convenient means whereby a desired portion or frame of a roll of film may be readily and quickly located for the purpose of viewing or other purpose. While the spiral slot 31 has been illustrated as extending along the disc 25 for an angle of only about 90 degrees, it will be understood that it may extend through a considerably greater angle as, for example, nearly 360 degrees, the length of the graduated scale 33 being correspondingly increased. A finer setting of the disc 26 and the point of intersection 32 of the slots may be thus secured.

The specification shows the feature of rotating the radially slotted disc to secure the greatest accuracy. It will be understood, of course, that in a modified form of construction, the disc containing the slot 30 may be secured to the hub and the disc containing the spiral 31 is then pivotally mounted on the hub. The illustrated form of construction is at present preferred by reason of its greater simplicity.

Figure 7:
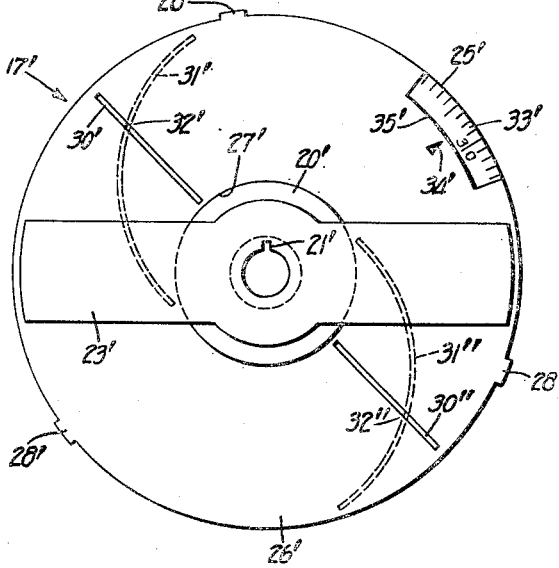
Fig. 7 is a front view of a take-up reel showing a modified form of the invention.
Figure 6:
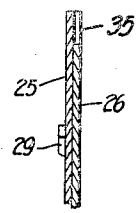
Fig. 6 is a fragmentary sectional view showing a portion of the periphery of the take-up reel of Fig. 3 taken on the line 6—6 thereof.

A modified form of the invention is shown in Fig. 7 in which the take-up reel 17' is similar in all respects to that shown in Figs. 1 and 3 to 6 and in which corresponding parts are indicated by the same reference numerals primed. In this case, the disc 26' is provided with two substantially radially arranged slots 30' and 30" and the disc 25' with two similar and oppositely disposed spirally shaped slots 31' and 31". The several slots are so arranged that their points of intersection 32' and 32" lie at the same distance from the center of the take-up reel so that, as the reel is rotated, the light passing through the said points of intersection forms a more continuous arcuate light path than in the case of the reel shown in Figs. 1 and 3 to 6. While only two pairs of slots in the discs have been shown, it will be understood that three or more pairs may be used to make the arcuate light track appear still more continuous.

While in the illustrated forms of the invention the areas of the discs 25—26 through which the light passes have been described as slots formed through the discs, it will be understood that the areas 30 and 31 may be translucent areas formed in the respective discs which are otherwise formed of material which is opaque, so that the only light seen by the operator is that passing through the point of intersection 32 of the two translucent areas. Or, in an alternative form of the invention, the spirally shaped area 31 may be formed by a coating of white or other light reflecting colored material applied to the front surface of the disc 25 so that a spot of reflected light will appear at the point of intersection 32. In this case the electric light 36 at the rear of the discs will not be required, but a suitable light source (not shown) will be provided in front of the discs or the natural light of the room in which the viewer is located may be used.

While for the purpose of clarity the invention has been described in connection with the use of microfilm in a viewing device, it will be understood that its use is not so limited, but that it is adapted to indicate the location of a particular section of any elongated web of thin, flexible material as, for example, paper, on which records have been written, printed or otherwise made and which is adapted to be wound up into the form of a roll on a take-up reel.

I have described what I believe to be the best embodiments of my invention. I do not wish, however, to be confined to the embodiments shown, but what I desire to cover by Letters Patent is set forth in the appended claims.

I claim:

1. An adjustable indicating device for indicating the position of a desired section of a web of thin flexible material marked with different records, said indicating device comprising a rotatable hub around which the web is adapted to be wound, an opaque disc secured to said hub and having a narrow elongated non-concentric area adapted to transmit light, and an adjustable shield having opaque portions extending across said narrow area in position to conceal all of said narrow area except a small exposed portion thereof, the radius of said exposed portion with respect to the center of the hub being controlled by the setting of said adjustable shield and the web, as it is wound upon said hub, being arranged to intercept a beam of light passing from the small exposed portion of said narrow area.

2. The indicating device as set forth in claim 1 in which said adjustable shield comprises a second disc mounted for rotation on said hub.

3. The indicating device as set forth in claim 1 in which said adjustable shield comprises a second disc mounted for rotation on said hub, and means for retaining said first named disc and second disc in frictional engagement with each other.

4. The indicating device as set forth in claim 1 in which the narrow area in said disc comprises an elongated non-concentric slot formed through the disc and in which said adjustable shield is provided with an elongated narrow slot disposed at an angle to said first named slot.

5. The indicating device as set forth in claim in which the narrow area in said disc comprises two oppositely disposed slots formed through the disc and in which said adjustable shield is provided with a pair of oppositely disposed narrow slots disposed at an angle to said first named slots.

6. The indicating device as set forth in claim 1 in which said disc is provided at its peripheral margin with a series of scale graduations and said adjustable shield is provided with an index movable alongside said scale graduations.

7. An adjustable indicating device for indicating the position of a desired frame on an elongated photographic film, said indicating device comprising a rotatable hub around which the film is adapted to be wound, a disc secured to said hub the major portion of said disc being opaque and said disc comprising a narrow elongated non-concentric portion formed of translucent material; a second disc mounted for rotation on said hub and disposed adjacent said first disc, the major portion of said second disc being opaque and said second disc comprising a narrow elongated portion formed of translucent material, the translucent portions of said discs being adapted to intersect at a point of variable radius as determined by the angular position of said discs and indicating means for indicating the relative angular positions of said discs.

8. The indicating device as set forth in claim 7 in which the translucent portion of one of said discs is substantially straight and the translucent portion of the other is spiral shaped.

FREDERIC G. LUDWIG.